US009826559B2

(12) United States Patent
Vangala et al.

(10) Patent No.: US 9,826,559 B2
(45) Date of Patent: Nov. 21, 2017

(54) INTRA-RRC HIGH-BANDWIDTH GRANT REQUEST TECHNIQUES

(71) Applicant: Apple Inc., Cupertino, CA (US)

(72) Inventors: Sarma V. Vangala, San Jose, CA (US); David Boettger, San Jose, CA (US); Vijay Kumar Ramamurthi, Milpitas, CA (US); Venkateswara Rao Manepalli, Sunnyvale, CA (US); Srinivas Pasupuleti, San Jose, CA (US); Swaminathan Balakrishnan, Santa Clara, CA (US); Samy Khay-Ibbat, San Francisco, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/143,739

(22) Filed: May 2, 2016

(65) Prior Publication Data

US 2016/0360558 A1 Dec. 8, 2016

Related U.S. Application Data

(60) Provisional application No. 62/169,966, filed on Jun. 2, 2015.

(51) Int. Cl.
*H04W 76/02* (2009.01)
*H04W 76/04* (2009.01)
(Continued)

(52) U.S. Cl.
CPC ........... *H04W 76/02* (2013.01); *H04W 28/02* (2013.01); *H04W 28/20* (2013.01);
(Continued)

(58) Field of Classification Search
CPC .............. H04W 76/02; H04W 76/048; H04W 52/0209; H04W 76/027; H04W 72/0486;
(Continued)

(56) References Cited

U.S. PATENT DOCUMENTS

| 5,699,361 A * | 12/1997 | Ding ...................... H04J 3/247 370/431 |
| 8,228,852 B2 | 7/2012 | Yi et al. |

(Continued)

*Primary Examiner* — Meless Zewdu
(74) *Attorney, Agent, or Firm* — Meyertons Hood Kivlin Kowert & Goetzel, P.C.; Jeffrey C. Hood; Michael B. Davis

(57) ABSTRACT

This disclosure relates to techniques for UEs (including link budget limited UEs) to improve communications performance with a cellular network. A UE may be configured to provide a request (for a first process executed by the UE) for a high-bandwidth connection to a base station of a cellular network during a first RRC connection. In some embodiments, the RRC connection is established by another process. In some embodiments, the UE is configured to receive signaling from the base station indicating that the base station cannot satisfy the high-bandwidth connection request and the UE is configured not to send or receive data for the high-bandwidth connection during the first RRC connection in response to the signaling. In some embodiments, the UE is configured to re-send the request on a second, subsequent RRC connection that is not established by the first process. In some embodiments, the UE is configured to opportunistically re-send the request on subsequent RRC connections established by one or more other processes until the base station is able to grant the request.

17 Claims, 7 Drawing Sheets

(51) Int. Cl.
   *H04W 52/02*     (2009.01)
   *H04W 28/02*     (2009.01)
   *H04W 28/20*     (2009.01)
   *H04W 72/12*     (2009.01)
(52) U.S. Cl.
   CPC ..... *H04W 52/0209* (2013.01); *H04W 76/027* (2013.01); *H04W 76/048* (2013.01); *H04W 72/1252* (2013.01); *Y02B 60/50* (2013.01)
(58) Field of Classification Search
   CPC . H04W 72/04; H04W 72/14; H04W 72/1294; H04W 52/02; H04W 76/04; H04W 76/046; H04W 76/06; H04W 76/025; H04W 76/028; H04W 76/00; H04W 76/0025; H04W 76/045; H04W 72/048; H04W 72/014; H04W 28/00; H04W 28/02; H04W 28/0257; H04W 28/20; H04W 4/02; H04W 88/02
   See application file for complete search history.

(56) References Cited

U.S. PATENT DOCUMENTS 9,088,976 B2    7/2015  Islam et al.
   2004/0029591 A1*  2/2004  Chapma ............ H04W 72/0453
                                                        455/452.1
   2004/0208126 A1* 10/2004  Wassew .................. H04L 47/10
                                                           370/235
   2009/0052388 A1*  2/2009  Kim ..................... H04W 74/002
                                                           370/329
   2010/0150134 A1*  6/2010  Qiu ....................... H04L 47/781
                                                           370/352
   2011/0261695 A1* 10/2011  Zhao ..................... H04W 28/10
                                                           370/232
   2012/0044836 A1*  2/2012  Sivavakeesar ........ H04W 24/02
                                                           370/255
   2012/0088495 A1*  4/2012  Tsai ..................... H04W 76/027
                                                           455/422.1
   2012/0230244 A1*  9/2012  Bienas .................. H04W 48/08
                                                           370/315
   2013/0324141 A1* 12/2013  Jung ..................... H04W 4/005
                                                           455/450
   2014/0064209 A1*  3/2014  Anchan ............... H04W 76/045
                                                           370/329
   2014/0226615 A1*  8/2014  Beale .................... H04W 28/20
                                                           370/329
   2015/0250007 A1    9/2015  Ramkull
   2015/0305034 A1* 10/2015  Balachandran ....... H04W 76/00
                                                           370/315

* cited by examiner

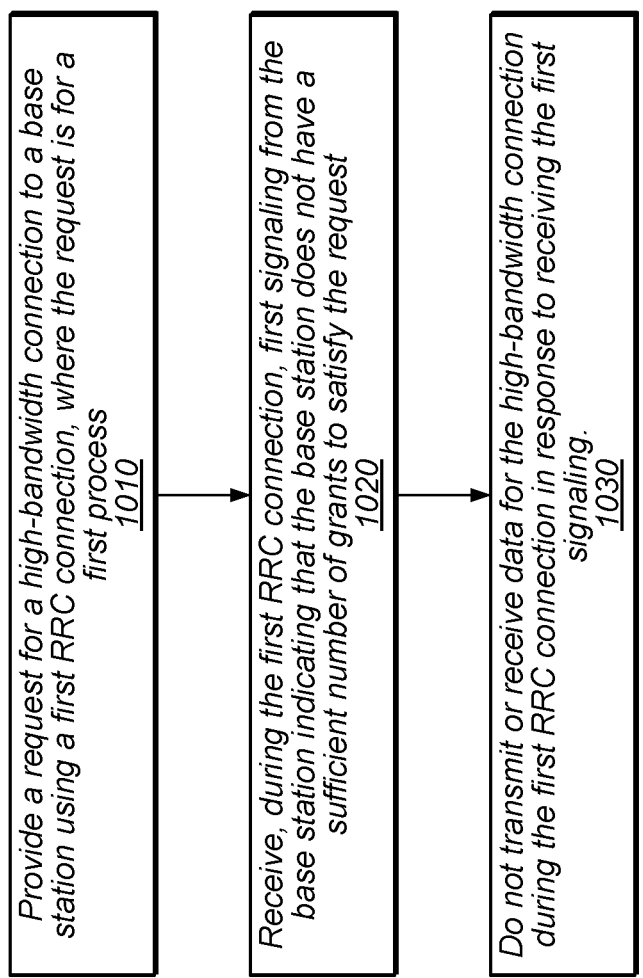

INTRA-RRC HIGH-BANDWIDTH GRANT REQUEST TECHNIQUES

PRIORITY CLAIM

This application claims the benefit of U.S. Provisional Application No. 62/169,966, filed on Jun. 2, 2015 the disclosure of which is incorporated by reference herein in its entirety.

FIELD

The present application relates to wireless devices, and more particularly to an apparatus, system, and method for providing improved communication procedures for link budget limited wireless devices.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices, which may have limited capabilities, to relatively complex (e.g., potentially more expensive) devices, which may have greater capabilities. Such devices may have different characteristics with respect to processing, memory, battery, antenna (power/range, directionality), and/or other capabilities. Devices that exhibit relatively limited reception and/or transmission capabilities (due to one or more of device design, antenna design or size, device size, battery size, current transmission medium conditions, and/or other factors) may be referred to in some instances as link budget limited devices.

In some situations high-bandwidth application traffic can consume significant power of a mobile device, especially when network traffic is high or when radio frequency (RF) conditions are poor. Some of this application traffic may be non-critical, such as uploading photos or downloading applications or application updates. Techniques for reducing power consumption for these transmissions may be desired.

SUMMARY

Embodiments are presented herein of methods for providing improved communication performance for wireless devices, and of devices (e.g., wireless devices (UEs), base stations) configured to implement the methods. For example, embodiments presented herein may provide improved LTE or LTE-Advanced performance for wireless devices, such as link budget limited devices. Some embodiments may relate to a user equipment (UE) mobile device configured to perform a subset or all of the operations described herein. The UE device may comprises more or more processing elements, one or more antennas, and one or more radios.

In some embodiments, the UE is configured to provide a request (for a first process executed by the UE) for a high-bandwidth connection to a base station of a cellular network during a first RRC connection. In some embodiments, the RRC connection is established by a second process executed by the UE, rather than the first, requesting process. In some embodiments, the UE is configured to receive, during the first RRC connection, signaling from the base station indicating that the base station does not have sufficient number of grants for the UE to satisfy the high-bandwidth connection request. In some embodiments, the UE is configured not to send or receive data for the high-bandwidth connection during the first RRC connection in response to the signaling from the base station. In some embodiments, the UE is configured to re-send the request on a second, subsequent RRC connection that is not established by the first process. In some embodiments, the UE is configured to opportunistically re-send the requests on subsequent RRC connections established by one or more other processes until the base station is able to grant the request. This may allow the base station to eventually grant the request during a trough in network traffic without overburdening RRC signaling, because existing RRC connections are used. The UE may be configured to submit a simple request and the base station quickly respond with a simple grant or denial for the high-bandwidth connection, allowing the UE to perform any other desired communication and then enter a sleep or idle mode until the next request. This disclosed techniques may reduce power consumption by sending and/or receiving data for high-bandwidth requests during shorter time intervals when the base station can provide high bandwidth while the UE can enter a sleep or idle mode at other times.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIG. 10 is a flow diagram illustrating a method.

Figure 1:
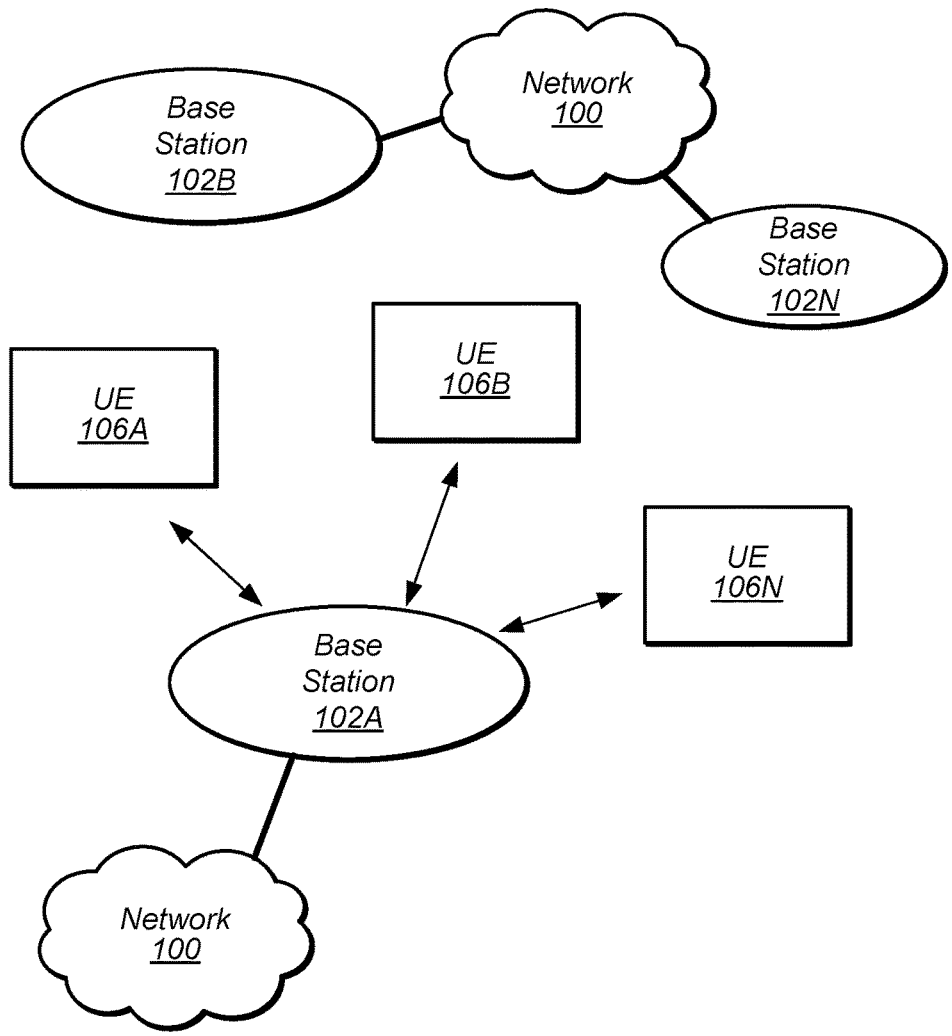
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
   3GPP2: Third Generation Partnership Project 2
   UMTS: Universal Mobile Telecommunication System
   EUTRA: Evolved UMTS Terrestrial Radio Access
   GSM: Global System for Mobile Communications
   LTE: Long Term Evolution
   PLMN: Public Land Mobile Network
   CQI: Channel Quality Indicator
   QCI: Quality of Service Class Identifier
   GBR: Guaranteed Bit Rate
   RAT: Radio Access Technology
   RRC: Radio Resource Control
   RSRP: Reference Signal Received Power
   RSRQ: Reference Signal Received Quality
   RX: Receive
   RLC: Radio Link Control
   RLF: Radio Link Failure
   TX: Transmit
   UE: User Equipment
   UMTS: Universal Mobile Telecommunications System Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
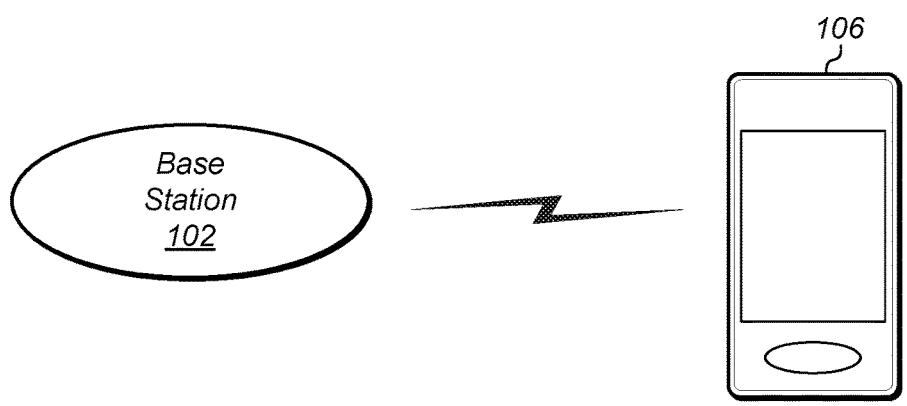
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include one or more programmable hardware elements such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
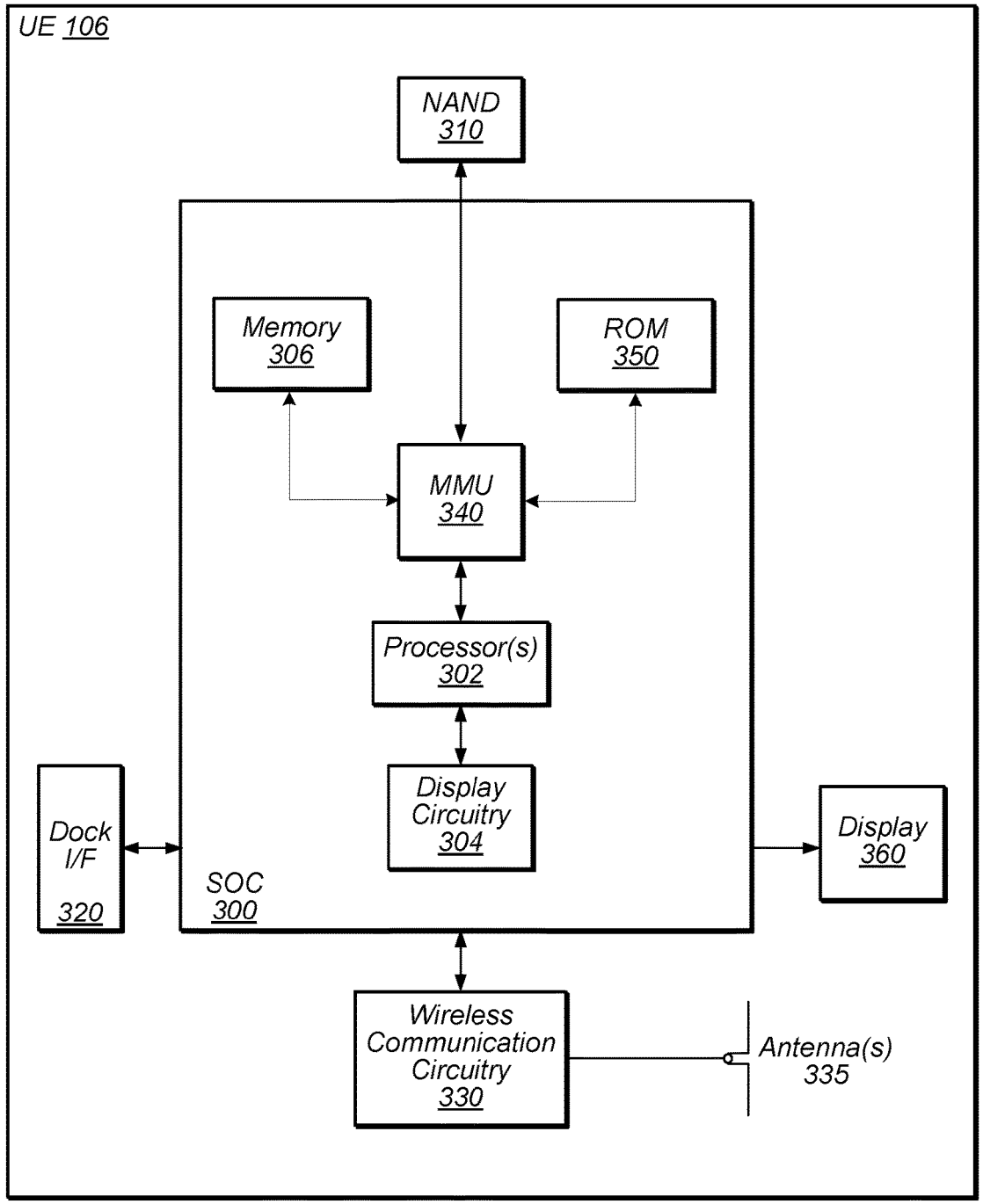
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Figure 4:
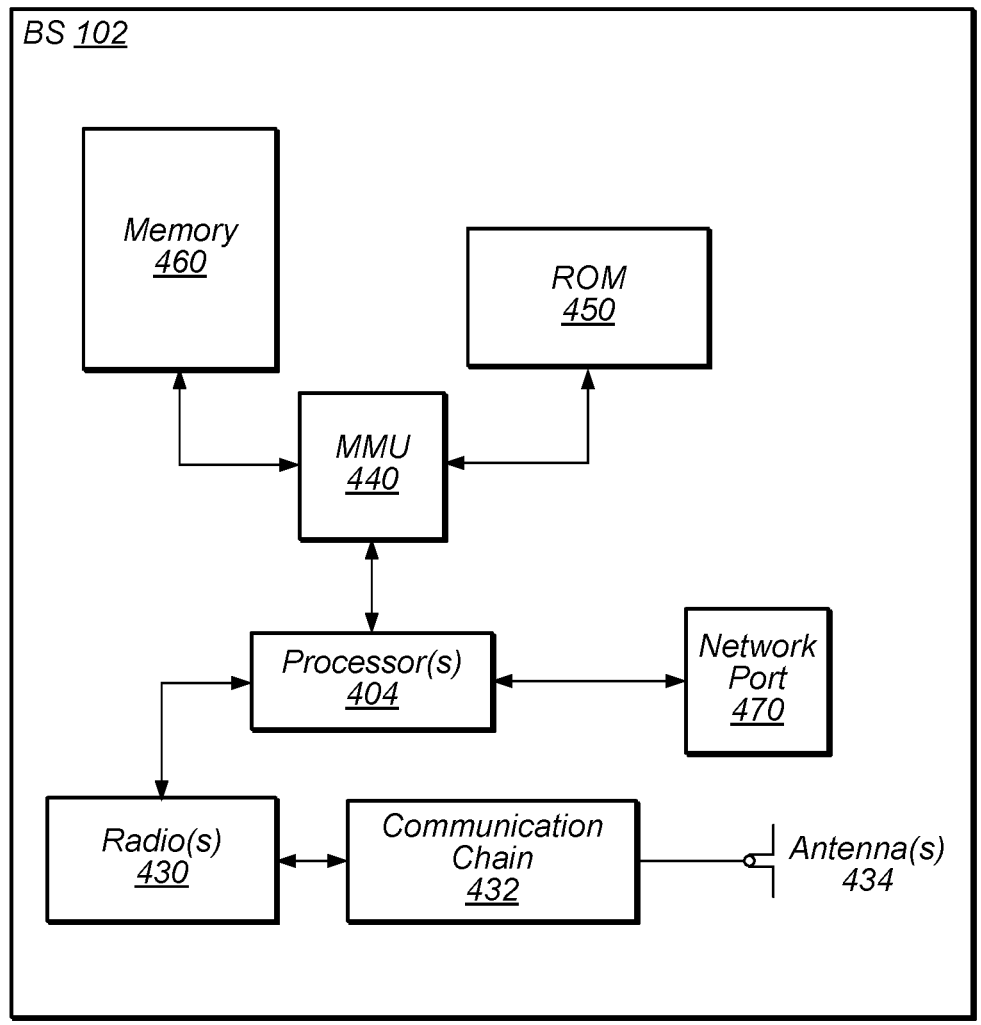
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Exemplary Improved Handling of High-Bandwidth Traffic

A UE may communicate various types of application traffic with a base station, including some traffic that is more critical (e.g., has more real-time requirements) and some traffic that is less critical, or even non-critical (e.g., has less or no real-time requirements). Some types of application traffic require high bandwidth but are non-critical to users in terms of real-time performance. Examples of such non-critical high-bandwidth traffic include photo uploads to a cloud server and application software downloads, such as from an app store. This high-bandwidth application traffic can consume large amounts of power in highly loaded and/or poor RF condition environments.

Because this application traffic is non-critical, however, the communication activity for these applications can be scheduled in RRC connections during eNB trough periods, i.e., periods when the base station is less busy (and hence when an eNB is able to provide better grants and better data throughput). These base station trough periods may occur a number of times during a day. Therefore, for at least some embodiments described herein, the base station and/or the UE may operate to schedule non-critical application traffic (and especially high-bandwidth, non-critical traffic) during such base station trough periods.

In some embodiments, a base station is configured to immediately respond to non-critical high-bandwidth requests that it cannot grant in the near future. In response, the UE may perform tasks not requiring high-bandwidth throughputs and/or time-critical tasks, then re-send the request for a non-critical high-bandwidth connection on a subsequent RRC connection. In various embodiments, a process with non-critical high-bandwidth requests is configured to opportunistically transmit the requests using RRC connections established by other processes, which may reduce RRC signaling and thus reduce network congestion and power consumption.

Embodiments described here may be particularly useful in the case of a link-budget limited device, which may have reduced capabilities as compared to other mobile communication devices conforming to the RAT standard, including, for example, an antenna deficiency. It is noted that the various operations described herein for link budget limited devices also applies to power limited UE devices, where the term "link budget limited" includes or encompasses power limited devices. Further, various techniques described herein may be implemented using devices that are not link budget limited.

FIG. 5—Flowchart

Figure 5:
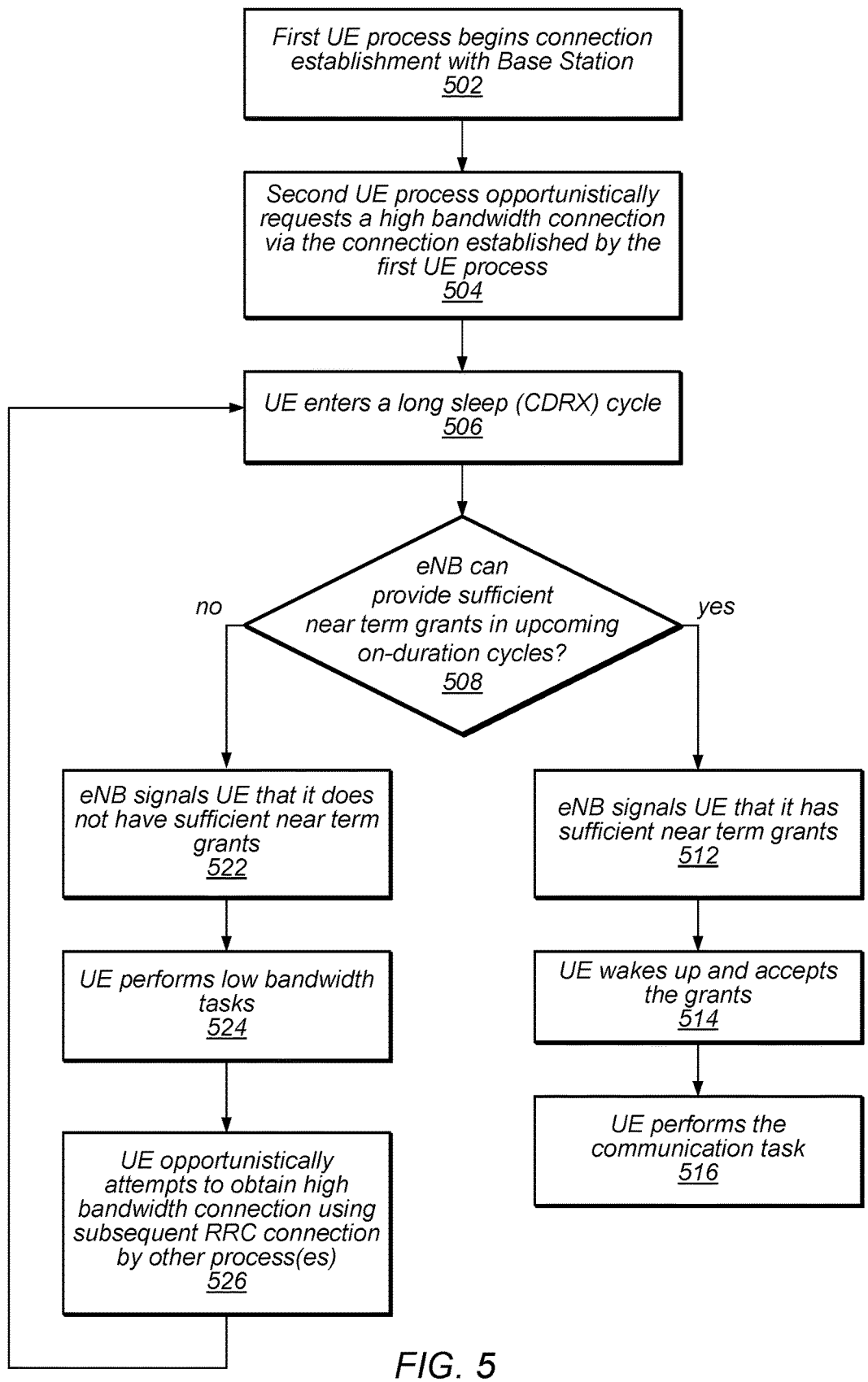
FIG. 5 is a flowchart diagram illustrating a method to opportunistically utilize network load troughs during existing RRC connections.

FIG. 5 is a flowchart diagram illustrating a method to perform improved scheduling of non-critical, high-bandwidth traffic between a UE and a base station, according to some embodiments. While elements of the method of FIG. 5 are described substantially with reference to the LTE wireless communication technology, part or all of the method may be used in conjunction with other wireless communication technologies, as desired.

The method shown in FIG. 5 may be used in conjunction with any of the computer systems or devices shown in the above FIGS. 1-4, among other devices. In various embodiments, some of the elements of the scheme shown may be performed concurrently, in a different order than shown, or may be omitted. Additional elements may also be performed as desired. As shown, the scheme may operate as follows.

In 502 a first UE process begins connection establishment with a base station (eNB). This may involve arranging an RRC connection with the base station. The first UE process may generate time-critical traffic.

In 504, during or soon after the connection establishment, a second, different UE process (which may or may not belong to a different application than the first process) opportunistically requests a high-bandwidth connection via the connection established by the first UE process (i.e., using an existing RRC connection). The second UE process may wake to make the request in response to detecting the RRC connection by the first process. The request may be for non-time-critical traffic such as photo uploads, application downloads/updates, etc.

In some embodiments, the second UE process may also or alternatively make requests for high-bandwidth connections via one or more RRC connections established by the second process itself rather than another process. Thus, various actions described herein as performed using connections established by other processes may be performed using connections established by the requesting process. Piggy-backing on other processes' connection(s), however, may reduce signaling overhead in some embodiments. The high-bandwidth request by the UE may be signaled in any of various manners, such as using an extended MAC (media access controller) CE (control element), using an RRC Connection Request (RRCConnectionRequest), or using other signaling techniques to make a simple request.

In 506, after the high-bandwidth connection request is provided from the UE to the base station, the UE may enter a sleep mode. For example, the UE may enter a long connected discontinuous reception (C-DRX) cycle. In other embodiments, the UE may not enter a sleep cycle, but may perform other transmissions, etc. while waiting for a response to the request, e.g., depending on current tasks being executed by the UE.

In 508 the base station determines whether it can provide a sufficient amount of grants (which may include UL and/or DL grants) in the near term to satisfy the high-bandwidth connection request (e.g., in upcoming scheduled on-duration cycles). In other words, the base station determines if it can allocate a sufficient amount of near-term bandwidth (in the form of UL and/or DL grants) to the UE to enable the UE to perform the high-bandwidth transfer. In either case, the base station responds to the request as soon as it has made the determination, in some embodiments. In some embodiments the response indicates the requesting application so that the UE can handle the response appropriately.

If the base station can provide a sufficient number of near-term grants to satisfy the high-bandwidth connection request as determined in 508, then operation proceeds to 512. In 512 the base station signals to the UE that it has sufficient near-term grants. In 514, the UE then wakes from the long sleep cycle (if sleeping) and accepts the grants. In 516, the UE performs the communications task (e.g., transmitting and/or receiving data) using the granted high-bandwidth connection.

If the base station cannot provide a sufficient number of near term grants to satisfy the high-bandwidth connection request as determined in 508, then operation proceeds to 522. In 522, the base station signals to the UE that it does not have sufficient near term grants. In 524, the UE performs low bandwidth tasks (e.g., as specified by the first UE process and/or the second UE process) but does not transmit or receive data for the requested high-bandwidth connection. The UE may subsequently enter a long sleep cycle after performing the low bandwidth tasks.

In 526, the UE opportunistically attempts to obtain the high-bandwidth connection using RRC connections established by one or more other processes (which may include RRC connections of the first UE process). This intra-RRC connection technique may allow the UE to utilize sleep cycles until a network trough occurs, without the base station needing to store complex UE state or schedule the high-bandwidth communications a significant time interval ahead. Rather, in these embodiments, the UE may be said to poll the base station (e.g., using existing RRC connections) until operational conditions are acceptable and the base station grants the request.

FIGS. 6-9—Exemplary Connection Scenarios

FIGS. 6-9 illustrate exemplary connection scenarios based on whether the requesting application/process is persistent and whether the network is able to initially grant the high-bandwidth request.

Figure 6:
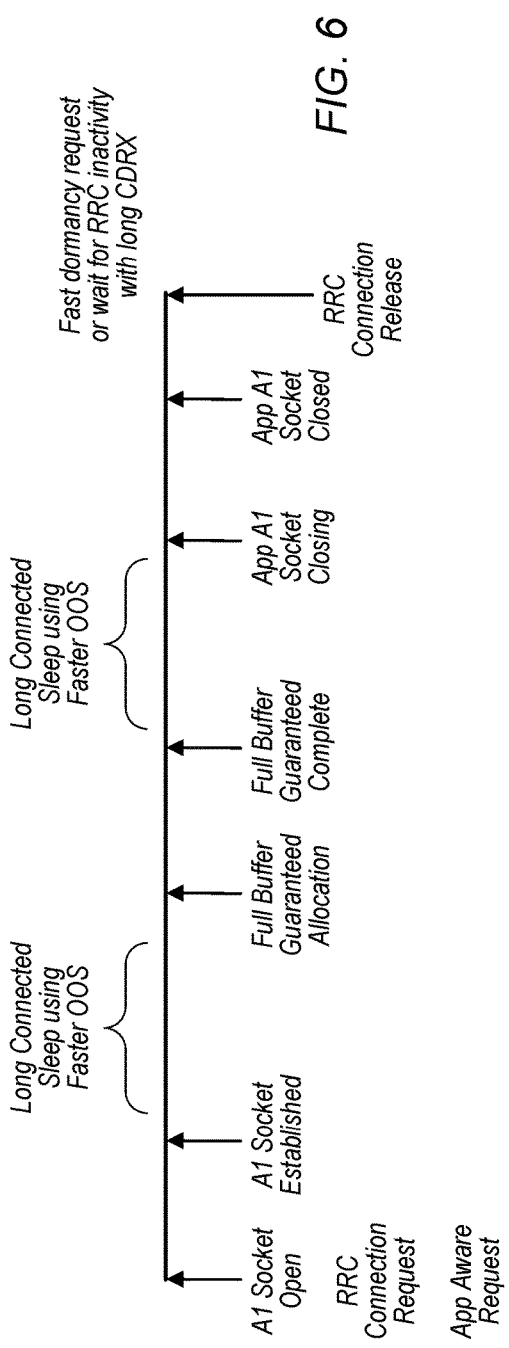
FIGS. 6-9 are timing diagrams illustrating exemplary connection scenarios.

In FIG. 6, application A1 is not persistent and the network is able to provide the requested connection. As shown, an RRC connection request is sent (by another process or by application A1) and a socket is opened for A1. In the illustrated embodiment, A1 sends an app-aware request that identifies A1 and requests non-time-critical high-bandwidth transmissions via the RRC connection. In this scenario, application A1 is not persistent and a socket is opened for the request. In typical scenarios, however, application A1 may piggyback on an existing persistent connection and/or other non-persistent connections to request high-bandwidth connections. As shown, the socket for A1 is established and the UE begins a long connected sleep (e.g., using C-DRX). In the illustrated embodiment, a faster out-of-sync (OOS) indication is used (e.g., less than 200 milliseconds) by the UE during this period. At this point, the UEs UL resources (e.g., SR, PUCCH, and/or PUSCH resources) may be released and the network may distribute these resources to other UEs. In other embodiments, an extended media access control (MAC) control element (CE) or a physical layer indication may be used to request the high-bandwidth connection.

In this scenario, in response to the UE's request for non-time-critical high-bandwidth transmissions, the network is able to provide the requested grants at the full buffer guaranteed allocation point. The high-bandwidth communication is complete at the full buffer guaranteed complete point, after which the UE may again enter a long connected sleep mode. Depending on current operating conditions, the UE may enter an RRC idle mode at this point rather than a long connected sleep. In the illustrated embodiment, the socket for the A1 application is then closed and the RRC connection is released. In some embodiments, the UE either requests fast dormancy or waits for RRC inactivity using a long C-DRX cycle.

Figure 7:
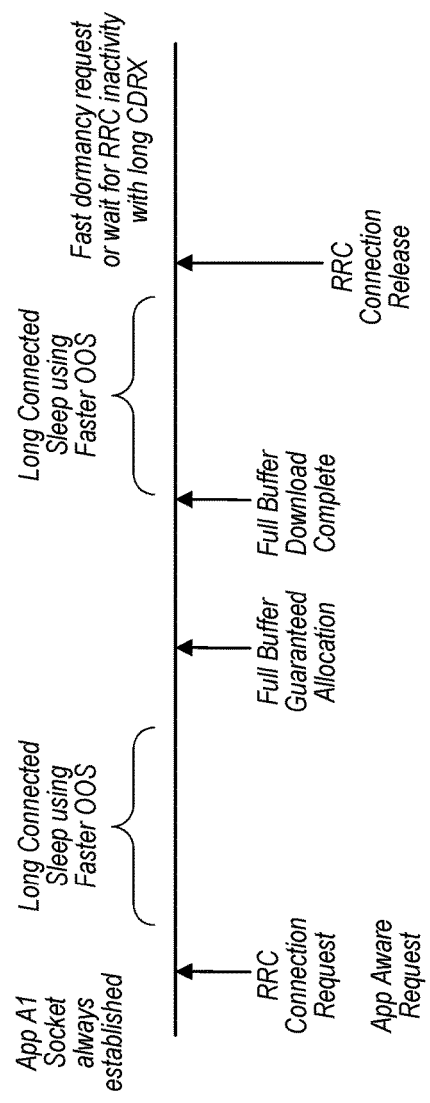

In FIG. 7, application A1 is persistent and the network is able to provide the requested connection. Scenario 2 is similar to scenario 1 shown in FIG. 6, except that the socket is not established or torn down because A1 is persistent (i.e., the A1 socket is always established during the relevant interval). Persistent applications/processes (such as those associated with push notifications, for example) may send a packet periodically to maintain a socket, which may save TCP round-trip time, for example. For non-persistent applications/processes, a socket may be set up and torn down when a connection is needed (e.g., to backup a photo, etc.).

Figure 8:
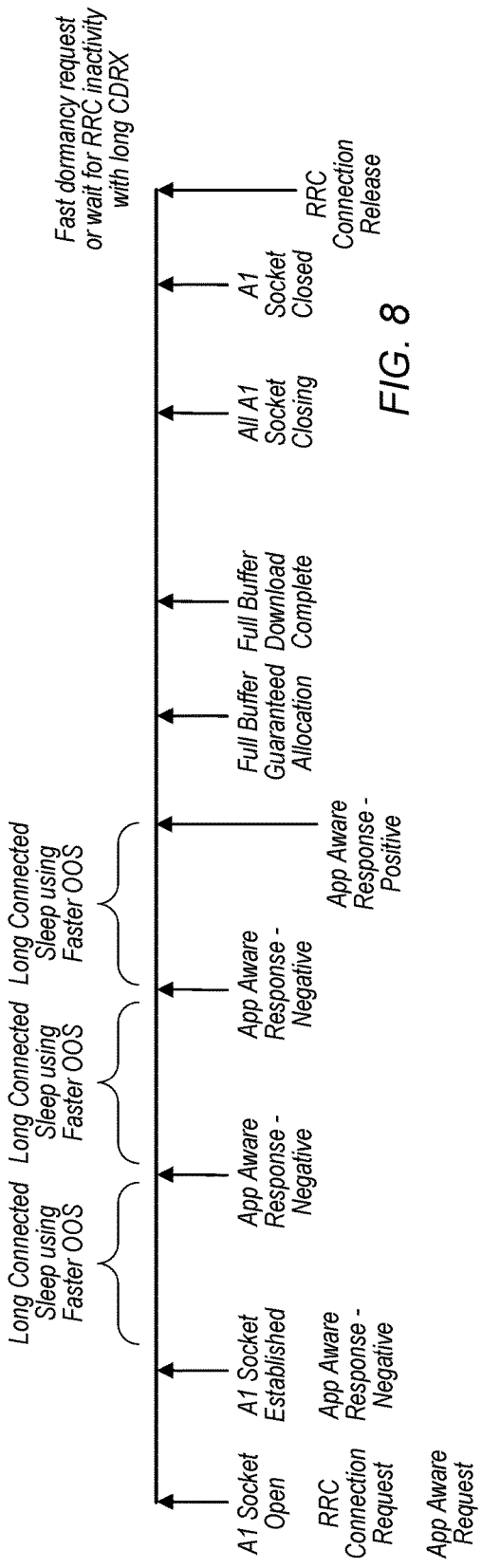

In FIG. 8, application A1 is not persistent and the application is initially unable to provide the requested high-bandwidth connection. In contrast to scenario 1, in scenario 3 the network determines that it cannot provide sufficient grants in upcoming on-duration cycles and gives an app-aware negative response that identifies the requesting application/process and indicates the negative nature of the response. (The negative response may be an app-aware response given at the RRC layer, MAC layer, physical layer, using NAS signaling, etc.) Based on the negative response, the UE enters another long connected sleep cycle. The UE may continue to initiate requests using existing RRC connections and receive responses until the network is able to provide the desired high-bandwidth connection, e.g., during a low-traffic interval. Although not shown, multiple RRC connections for other processes may exist during the illustrated long connected sleep cycles and A1 may utilize those RRC connections to re-submit the requests (resubmissions not shown) until the network can grant the request. This may reduce RRC signaling and thus reduce power consumption, in some embodiments. Further, because the network may respond quickly to each request, the on-duration between long connected sleep cycles may be small. The UE and/or base station may maintain threshold information used to determine whether the base station can grant enough resources to satisfy the high-bandwidth connection request.

Eventually, (after three cycles in the illustrated embodiment, although the number of cycles is exemplary and may vary) the network provides a positive response and the UE uses the allocation to transmit and/or receive data using the provided high-bandwidth connection. Subsequently, the A1 socket and the RRC connection are closed. In some embodiments, the UE either requests fast dormancy at this point or waits for RRC inactivity using a long C-DRX cycle.

In some embodiments, scenarios 1 and 2 may not occur or may almost never occur, as one or more persistent processes will almost always be initiating RRC connections, which application A1 can utilize to send its app-aware request(s).

Figure 9:
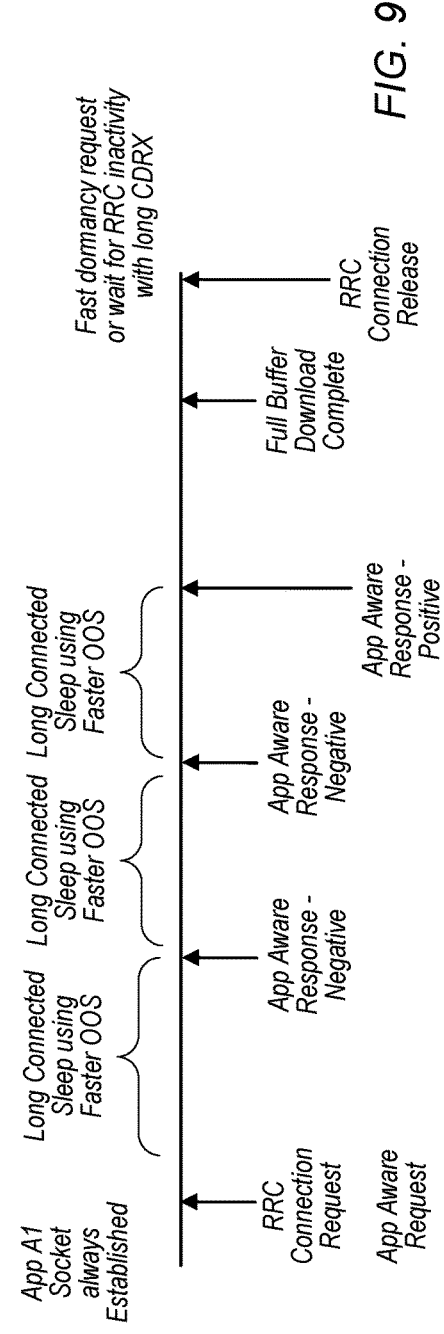

In FIG. 9, application A1 is persistent and the network is not initially able to provide the requested connection. Scenario 4 is similar to scenario 3, except that A1 is persistent, so the application A1 socket is not established or torn down.

FIG. 10 is a flow diagram illustrating a method for requesting a high-bandwidth connection over an RRC connection, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, UE 106 provides a request for a high-bandwidth connection for a first process. The request is provided to a base station using a first RRC connection. In some embodiments, the first RRC connection is established by a second, different process running on UE 106. In these embodiments, the first process may opportunistically use the first RRC connection to make the request, e.g., based on determining that the first RRC connection is available to make the request.

At 1020, in the illustrated embodiment, UE 106 receives, during the first RRC connection, first signaling from the base station indicating that the base station does not have a sufficient number of grants for the apparatus to satisfy the high-bandwidth connection request. This may be based on congestion from other mobile devices, for example.

At 1030, in the illustrated embodiment, UE 106 does not transmit or receive data for the high-bandwidth connection during the first RRC connection in response to receiving the first signaling. In some embodiments, UE 106 instead waits until a subsequent RRC connection is established (e.g., by another process or the requesting process) to request the high-bandwidth connection. In some embodiments, UE 106 then receives, during the subsequent RRC connection, second signaling indicating that the base station has a sufficient number of uplink grants to satisfy the request. In some embodiments, UE 106 is configured to transmit and/or receive data using the high-bandwidth connection during the second RRC connection in response to receiving the second signaling.

In some embodiments, UE 106 enters a C-DRX mode after providing the request and the first signaling indicates that the base station does not have a sufficient number of uplink grants in upcoming on-duration periods of the C-DRX mode to satisfy the high-bandwidth connection request.

In various embodiments, the application/process requesting high-bandwidth connections may be a background application/process. In other embodiments, similar techniques may be used for foreground traffic, e.g., for HTTP live streaming (HLS). In these embodiments, higher bursts of data may be downloaded during on-duration cycles of the foreground application/process based on the disclosed grant requests and negative/positive responses. For example, physical layer conditions may vary and the application may request a particular quality in the next grant. This may conserve baseband power by using high-bandwidth connections during network trough intervals and sleeping at other times, which may result in a greater amount of overall sleep time, etc. As used herein "high-bandwidth" may be defined according to various criteria and/or threshold values, e.g., based on physical layer conditions. Therefore a "high-bandwidth" request for one UE or application may or may not be considered high-bandwidth for another UE and/or application.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   at least one processor configured to:
   provide, for a first process executed by the apparatus that has not established a radio resource control connection, a request for resources for a high-bandwidth communication with a base station of a cellular network, wherein the request is transmitted to the base station using a first radio resource control connection that is established by a second, different process executed by the apparatus; and
   receive, during the first radio resource control connection, first signaling from the base station indicating that the base station does not have a sufficient number of uplink grants for the apparatus to satisfy the high-bandwidth communication request;
   wherein the apparatus is configured not to transmit or receive data for the high-bandwidth communication for the first process during the first radio resource control connection in response to receiving the first signaling; and
   wherein the first process opportunistically uses the first radio resource control connection to make the request based on detecting the first radio resource control connection that was established by the second, different process executed by the apparatus.

2. The apparatus of claim 1, wherein the apparatus is further configured to:
   use a second, subsequent radio resource control connection to re-send the request for the high-bandwidth communication to the base station, wherein the second radio resource control connection is established by a different process and not by the first process;
   receive, during the second radio resource control connection, second signaling from the base station indicating that the base station has the sufficient number of uplink grants for the apparatus to satisfy the high-bandwidth communication request; and
   transmit and/or receive data for the high-bandwidth communication during the second radio resource control connection in response to receiving the second signaling indicating that the base station has the sufficient number of uplink grants to satisfy the high-bandwidth communication request.

3. The apparatus of claim 1,
wherein the apparatus is further configured to enter a connected discontinuous reception (C-DRX) mode after providing the request for the high-bandwidth communication to the base station; and
wherein the first signaling indicates that the base station does not have the sufficient number of uplink grants in upcoming on-duration periods of the C-DRX mode for the apparatus to satisfy the high-bandwidth communication request.

4. The apparatus of claim 1,
wherein the request for the high-bandwidth communication is indicated as not having real-time transmission requirements; and
wherein the apparatus only provides the request for the high-bandwidth communication to the base station during a plurality of existing radio resource control connections established by one or more other processes executed by the apparatus and the first process does not establish an radio resource control connection.

5. The apparatus of claim 1,
wherein the apparatus is further configured to perform only low bandwidth tasks for a period of time in response to receiving the first signaling from the base station.

6. The apparatus of claim 1,
wherein the first process does not have real-time transmission requirements.

7. The apparatus of claim 1,
wherein the apparatus is configured to transmit the request for the high-bandwidth communication using an application-aware request.

8. The apparatus of claim 1, wherein the apparatus is configured to transmit the request for the high-bandwidth communication using an radio resource control Connection Request.

9. The apparatus of claim 1,
wherein the first signaling is contained in an extended media access control (MAC) control element (CE) transmitted by the base station.

10. The apparatus of claim 1,
wherein the first signaling is contained in an radio resource control Reconfiguration message transmitted by the base station.

11. The apparatus of claim 1,
wherein the first process is for a first application executed by the apparatus and the second process is for a second, different application executed by the apparatus.

12. The apparatus of claim 1,
wherein the request for the high-bandwidth communication identifies a type of application traffic of the request.

13. A non-transitory computer-readable medium having instructions stored thereon that are executable by a computing device to perform operations comprising:
providing, for a first process executed by the computing device that has not established a radio resource control connection, a request for resources for a high-bandwidth communication with a base station of a cellular network, wherein the request is transmitted using a first radio resource control connection that is established by a second, different process executed by the computing device, wherein the first process opportunistically uses the first radio resource control connection to provide the request in response to detecting the first radio resource control connection that was established by the second, different process executed by the computing device;

receiving, during the first radio resource control connection, first signaling from the base station indicating that the base station does not have a sufficient number of uplink grants for the computing device to satisfy the high-bandwidth communication request;
in response to receiving the first signaling, waiting at least until a second, subsequent radio resource control connection to request the high-bandwidth communication, wherein the second radio resource control connection is established by a third process executed by the computing device;
receiving, during the second radio resource control connection, second signaling from the base station indicating that the base station has the sufficient number of uplink grants for the computing device to satisfy the high-bandwidth communication request; and
transmitting and/or receiving data for the high-bandwidth communication during the second radio resource control connection in response to receiving the second signaling indicating that the base station has the sufficient number of uplink grants to satisfy the high-bandwidth communication request.

14. The non-transitory computer-readable medium of claim 13, wherein the operations further comprise entering a connected discontinuous reception (C-DRX) mode after providing the request for the high-bandwidth communication to the base station; and
wherein the first signaling indicates that the base station does not have the sufficient number of uplink grants in upcoming on-duration periods of the C-DRX mode for the computing device to satisfy the high-bandwidth communication request.

15. The non-transitory computer-readable medium of claim 13, wherein the request for the high-bandwidth communication is indicated as not having real-time transmission requirements; and
wherein the operations include only providing the request for the high-bandwidth communication to the base station during one or more existing radio resource control connections established by one or more other processes.

16. A method, comprising:
providing, for a first process executed by a mobile computing device that has not established a radio resource control connection, a request for resources for a high-bandwidth communication with a base station of a cellular network, wherein the request is transmitted using a first radio resource control connection that is established by a second, different process executed by the mobile computing device, wherein the first process opportunistically uses the first radio resource control connection to provide the request in response to detecting the first radio resource control connection that was established by the second, different process executed by the mobile computing device;
receiving, by the mobile computing device, during the first radio resource control connection, first signaling from the base station indicating that the base station does not have a sufficient number of uplink grants for the mobile device to satisfy the high-bandwidth communication request;
in response to receiving the first signaling, the mobile device waiting at least until a second, subsequent radio resource control connection to request the high-bandwidth communication;
receiving, by the mobile device during the second radio resource control connection, second signaling from the base station indicating that the base station has the sufficient number of uplink grants to satisfy the high-bandwidth communication request, wherein the second radio resource control connection is established by a third process executed by the mobile computing device; and transmitting and/or receiving data, by the mobile device for the high-bandwidth communication during the second radio resource control connection, in response to receiving the second signaling indicating that the base station has the sufficient number of uplink grants to satisfy the high-bandwidth communication request.

17. The method of claim 16, further comprising entering a connected discontinuous reception (C-DRX) mode after providing the request for the high-bandwidth communication to the base station; and wherein the first signaling indicates that the base station does not have the sufficient number of uplink grants in upcoming on-duration periods of the C-DRX mode for the mobile device to satisfy the high-bandwidth communication request.

* * * * *